(12) United States Patent
Rosener

(10) Patent No.: US 9,253,674 B2
(45) Date of Patent: Feb. 2, 2016

(54) DECREASING RSSI SETTLING TIME IN LOW-POWER MODE SYSTEMS

(75) Inventor: Doug Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 967 days.

(21) Appl. No.: 13/191,248

(22) Filed: Jul. 26, 2011

(65) Prior Publication Data

US 2013/0029607 A1    Jan. 31, 2013

(51) Int. Cl.
| | | |
|---|---|---|
| H04W 64/00 | (2009.01) | |
| H04W 24/10 | (2009.01) | |
| H04W 52/02 | (2009.01) | |
| H04M 1/60 | (2006.01) | |

(52) U.S. Cl.
CPC .......... *H04W 24/10* (2013.01); *H04W 52/0245* (2013.01); *H04M 1/6066* (2013.01); *H04M 2250/02* (2013.01); *H04M 2250/06* (2013.01); *H04W 64/006* (2013.01)

(58) Field of Classification Search
CPC .................................................. H04W 64/006
USPC ................................ 455/456.1, 6, 457, 404.2
See application file for complete search history.

(56) References Cited

U.S. PATENT DOCUMENTS

| | | | |
|---|---|---|---|
| 2006/0003700 A1* | 1/2006 | Yasuda et al. ................. 455/41.2 |
| 2006/0229114 A2* | 10/2006 | Kim ........................... 455/575.1 |
| 2007/0207807 A1* | 9/2007 | Duda ............................. 455/441 |
| 2008/0099563 A1* | 5/2008 | Wormald et al. ........ 235/472.01 |
| 2008/0171568 A1* | 7/2008 | Choi et al. ..................... 455/522 |
| 2009/0068955 A1* | 3/2009 | Machii et al. ................. 455/67.7 |
| 2010/0159840 A1 | 6/2010 | Rosener et al. |
| 2011/0092157 A1 | 4/2011 | Clark et al. |
| 2011/0117856 A1* | 5/2011 | Veluppillai et al. ........ 455/67.11 |
| 2011/0312286 A1* | 12/2011 | Lin et al. ......................... 455/73 |

OTHER PUBLICATIONS

Stephen V. Cahill, Near-Far Sensing Using Frequency Swept RSSI, U.S. Appl. No. 11/906,670, filed Oct. 2, 2007.

* cited by examiner

*Primary Examiner* — Wen Huang
(74) *Attorney, Agent, or Firm* — Chuang Intellectual Property Law

(57) ABSTRACT

Methods and apparatuses presented herein advantageously enable more accurate RSSI measurements by waking up a mobile device from a low-power mode in certain pre-designated situations. These situations include detecting certain trends in RSSI values, detecting changes in transmit power, or detecting motion. The trigger which causes the mobile device to enter the active mode from the low power mode may differ in varying examples.

27 Claims, 6 Drawing Sheets

DECREASING RSSI SETTLING TIME IN LOW-POWER MODE SYSTEMS

BACKGROUND OF THE INVENTION

Radio Signal Strength Indication (RSSI) measurements in wireless communications systems are useful for a variety of reasons. RSSI measurements may be used in optimizing transmit levels for improved reception, conserving power due to transmit, and keeping transmit power low so as to avoid interference. Furthermore, RSSI can be used in ranging applications to make estimations on the distance between a transmitter and a receiver as the radio signal strength received typically decreases with increased distance from the transmitter.

When used for power control, a receiver can send commands to a transmitter if the RSSI gets too low or too high. The transmitter can then make any necessary adjustments to the transmit power. However, when RSSI is used in ranging applications, the transmit power must either be fixed or the relative changes known to make a range estimate. This is because the RSSI received is typically proportional to the transmitted power.

Because of multi-path interference (reflections), motion of receiver and transmitter, and a variety of other factors, a single RSSI measurement is usually not accurate. One way to improve accuracy is to take multiple RSSI samples and average them. Another way to reduce errors due to multi-path is take the RSSI samples at different frequencies. Multi-Frequency systems (hopped or other-wise) already change frequencies to optimize reception for this very reason. By taking RSSI measurements at each frequency and averaging these, one can get a better estimate of range as the individual measurements may have different results depending on frequency.

Many wireless devices have both an "active mode" and a "low power mode" (also referred to herein as "reduced power mode") of operation. In low power mode, the wireless device reduces operation in some manner to conserve power. In active mode, taking multiple RSSI samples as desired does not present a problem because the measurements are a small burden relative to the power intensive time consuming process of maintaining an active link. The term "active mode" includes the full power mode of operation of the device, but may also refer to any mode of operation in which the device consumes more power than the "low power mode".

However, when a wireless system goes into low power mode, unnecessary operations are canceled in order to reduce power. The system cannot always be RSSI sampling as this takes time and power. RSSI averaging is essential in frequency hopped systems as any given channel may be significantly worse than the overall path loss due to distance. Typically the system will wake-up, take a measurement and go back to sleep. For example, if the system requires 100 samples in its average, there can be a very long settling time to a step change on the average RSSI value in low-power mode compared to the active mode settling time (and faster sample rate) if the time between wakeups is long. There will also be long delays while a change in transmit power is integrated into the RSSI estimate. For example, in a system where the system averages a pre-determined number of measured RSSI values to determine an accurate RSSI value, the settling time is the time it would take all of the samples to be flushed through the averaging filter once a change in RSSI has been detected (e.g., due to movement of the mobile device). In low-power mode, the settling time is relatively long due to the increased length of time between measurements. In contrast, the settling time for the averaging filter is much faster in active mode where RSSI measurements are made with increased frequency. In a further embodiment, the settling time may be the time it takes for the mobile device to retrieve/measure a pre-determined number of RSSI measurements. In this case, the settling time is much longer for the low-power mode than the active mode for the same reasons.

In the prior art, one way to reduce the settling time has been to reduce the number of RSSI samples averaged. However, while this speeds up the process, it also means that the average value will be fairly inaccurate due to the reasons that motivated averaging in the first place. Another solution is to reduce the time between low-power samplings. However, the power savings of low power mode is based on duty cycling, where the duty cycle is the ratio of time to time between wake-ups. Thus, reducing sample time undesirably increases power consumption during the low-power state.

As a result, improved methods and apparatuses are needed for RSSI measurements.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
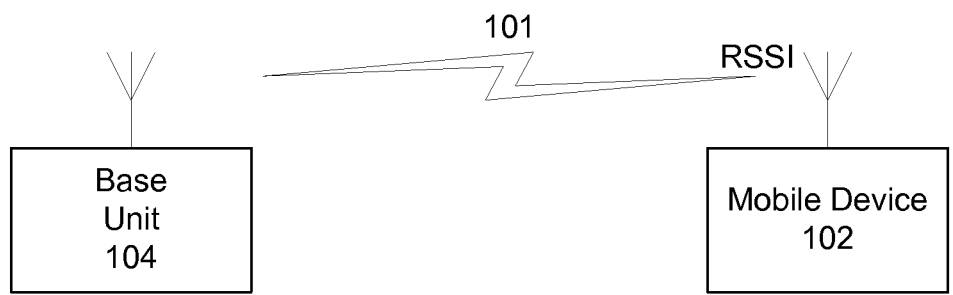
FIG. 1 illustrates a system for RSSI based sensing in one example.

Methods and apparatuses for RSSI measurements are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Methods and apparatuses presented herein advantageously enable more accurate RSSI measurements by waking up a mobile device from a low-power mode in certain pre-designated situations. These situations include detecting certain trends in RSSI values, changes in transmit power, or motion detection. The trigger which causes the mobile device to enter active mode may differ in varying examples.

In one example, a method for measuring RSSI includes receiving a first plurality of RSSI values during operation of a mobile device in a reduced power mode, and processing the first plurality of RSSI value to identify a trend in the first plurality of RSSI values indicating possible movement of the mobile device. The method includes entering an active mode at the mobile device responsive to identification of the trend, and receiving a second plurality of RSSI values during operation of the mobile device in the active mode. The method includes processing the second plurality of RSSI values. In one example, these method steps are all performed at the mobile device. In a further example, certain method steps may be performed at a base unit.

In one example, a method for measuring RSSI includes operating a mobile device in a reduced power mode, receiving a status update message from the base during operation of a mobile device in the reduced power mode, and entering an active mode at the mobile device responsive to the status update message. The method further includes receiving a plurality of RSSI values from the mobile during operation of the mobile device in the active mode, and processing the plurality of RSSI values at the base.

In one example, a mobile device includes a wireless transceiver for sending and receiving signals, and a memory storing an operational mode application program for selecting and operating the mobile device in a reduced power mode or an active mode. The processor is configured to execute the operational mode application program to process a first plurality of RSSI signals received during the reduced power mode to identify a trend indicating possible movement of the mobile device and switch to the active mode responsive to identifying the trend, where the processor is further configured to process a second plurality of RSSI signals received during the active mode.

In one example, a mobile device includes a wireless transceiver for sending and receiving signals, and a memory storing an operational mode application program for selecting and operating the mobile device in a reduced power mode or an active mode. The mobile device includes a processor configured to execute the operational mode application program to receive a status update message sent from the base received during the reduced power mode and switch to the active mode responsive to the status update message, where the processor is further configured to process a second plurality of RSSI signals received during the active mode.

In one example, a process is presented to speed up the RSSI settling time when a wireless device is in low power mode. For example, the process may be implemented in software. In one embodiment, the device is a headset, but it may be any device that uses wireless communication. The device is in a periodic loop where it measures the RSSI for an associated base unit. There can be more than one base unit being processed by the device. The process monitors the RSSI and looks for trends. If it detects a trend through any number of methods in the received RSSI, it wakes up from its low power mode for a pre-determined time and rapidly gets a more accurate value of RSSI. Then it returns to low power mode. Alternatively, the device may wait until it no longer detects a trend before returning to low power mode.

For example, a trend may be declared if RSSI increased (decreased) n times in a row of consecutive readings without repeated value or a decrease (increase). The trend might allow m repeats of consecutive RSSI values between increases (decreases), where n and m are whole numbers. Any decrease (increase) from a previous RSSI value would reset the trend analyzer.

In one embodiment the mobile device takes itself in and out of low power mode. In cases where the base unit is the master unit, m some instances the slave unit mobile device cannot wake itself up without a command message from the base unit. In this embodiment, when the mobile device detects a RSSI trend, it may send a message to the base unit. The base unit then takes the mobile device in and out of low power mode. The mobile device may also send a message to the base unit when it has determined the trend has stopped. An alternative to this embodiment is for the mobile device to send raw RSSI data and let the base determine if there is a trend. IF there is one, the base can then take the mobile out of low power mode.

Another aspect of this method involves transmit power control correction. In one example, the base unit includes an application configured to periodically monitor its transmit level to the mobile device. For example, the application may periodically query the base unit transceiver for the current transmit level. If the base unit application detects a transmit power change, it notifies the mobile device and provides the new power level. The mobile device wakes up on reception of this new power level, incorporates the Tx power change into its processing, allowing it to achieve a more accurate power independent-RSSI determination more quickly. As before, the device can wake itself up and go back to low power mode after a predetermined time, or when it has determined that RSSI estimate has settled. Alternatively, the base unit may wake up the mobile device whenever there is a transmit power change, and the mobile device may signal the base unit when it is ready to go back to low power mode, whereupon the base unit will put the mobile device into the low power state.

In a further example, the mobile device queries the base unit for the current transmit power level. In one example, every time the mobile device retrieves or measures the most recent RSSI, it checks the current transmit power level as well. In one particular case, if the mobile device detects a trend in RSSI, the mobile device queries the base unit for the current transmit power level.

In one example, the mobile device is a Bluetooth (BT) headset. The preferred BT mode of operation is to have the Bluetooth headset control its own low-power mode. This way the Bluetooth headset can detect proximity (e.g., NEAR/FAR status) in an efficient manner, independent of other devices. If the Bluetooth headset does not control its low-power mode, it must communicate with an application on the other device (e.g., the base unit or audio gateway), letting it know that it needs to wake-up or go to sleep explicitly if improved RSSI settling time is desired. In one example, the BT headset is taken out of low-power mode whenever an event occurs that would benefit. For example, if there is a Tx power level change, the headset should wake up so its RSSI can quickly adjust to the new level and be compensated for by the new Tx power level. If there is a trend in the RSSI (due to the motion of the user), again the headset wakes up to quickly adapts its RSSI to the new levels for a quicker response on proximity (e.g., NEAR/FAR status).

The methods and apparatuses presented herein advantageously provide ranging determinations with greater accuracy, speed, and lower power than currently known methods for a given system. In one example, because trends in received RSSI do not happen all the time, the device can stay in low power mode, using extra power only when the wireless device is in motion or there is a significant disturbance in its received power.

FIG. 1 illustrates a system for RSSI based sensing in one example. FIG. 1 is a drawing illustrating how RSSI may be employed to determine proximity of a mobile device, in accordance with an aspect of the present invention. For example, the mobile device may be a headset. Although certain examples described herein refer to a headset, the apparatus and methods described are also applicable to other body worn or carried devices such as mobile phones.

Referring now to FIG. 1, a system 100 includes a mobile device 102 and a base unit 104 capable of wireless communication there between. Base unit 104 is coupled to a telecommunications network. In one example, base unit 104 is an access point (AP) or a BT base unit, which is operably coupled with a network. The network may be a communications network which may include a public switched telephone network (PSTN), a cellular network, an integrated services digital network (ISDN), a local area network (LAN), and/or a wireless local area network (WLAN), that support standards such as Ethernet, wireless fidelity (WiFi), and/or voice over internet protocol (VoIP). In one example, the access point includes a transceiver and a processor configured to allow a wireless device (e.g., mobile device 102) access to a network connected to the access point (e.g., via a 10/100 Ethernet RJ-45 port). The access point may be any device that allows wireless-equipped computers and other devices to communicate with a wired network. In one example, the access point is able to support WiFi in general, and the 802.11a, 802.11b, and/or 802.11g wireless networking standards in particular. In other examples, the access point may be able to support other wireless networking standards.

The term "base unit" as used herein refers to any transmit power source. For example, base unit 104 may be a smart phone and mobile device 102 may be a headset. In further examples, base unit 104 does not have network connectivity.

In one example, the received signal strength indicator (RSSI) of the wireless link 101 is measured and monitored over time to determine the proximity of a mobile device 102. In a further example, the RSSI may be monitored only for optimizing communication. In one example, the mobile device is in low power mode, but senses that it may be rotating out of range due to a trend in RSSI and the mobile device rotates its antenna position when awake to optimize communication. The mobile device wakes up, re-orients its antenna based on strongest RSSI, and then returns to sleep mode.

In one example, the base unit 104 can be configured to query the mobile device 102 as to what the RSSI is. In a further example, the mobile device 102 is configured to send the RSSI measurements to the base unit 104. In one example, the RSSI measurements are processed at the mobile device 102 to determine the mobile device proximity. In a further example, the RSSI measurements are processed at the base unit 104 to determine the mobile device proximity.

Figure 2:
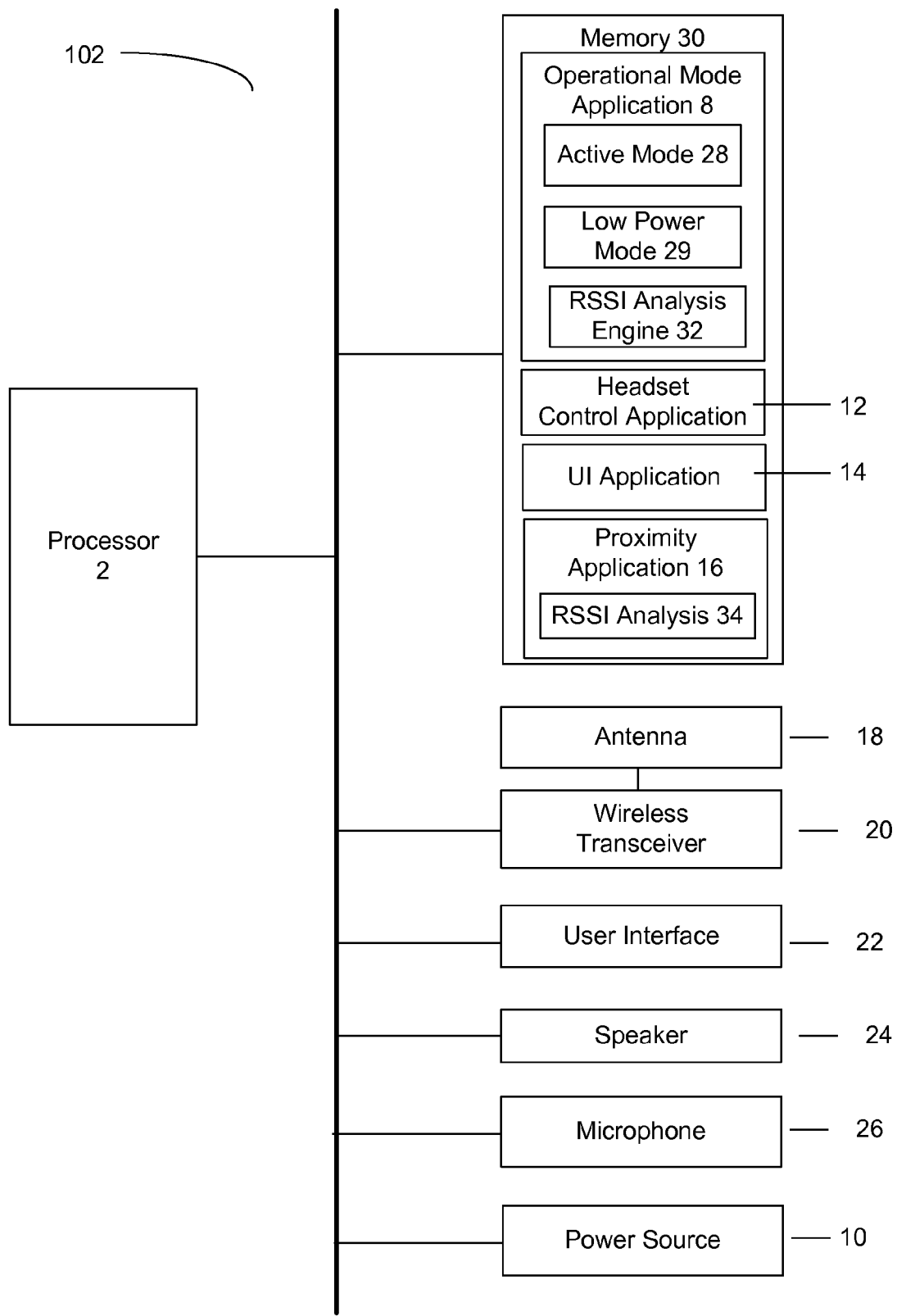
FIG. 2 illustrates a block diagram of the mobile device shown in FIG. 1 in one example, where the mobile device includes an operational mode application program.

Referring now to FIG. 2 in conjunction with FIG. 1, a simplified block diagram of an example of mobile device 102 is shown, where the mobile device includes an operational mode application program. Mobile device 102 includes a processor 2 operably coupled to a memory 30, a wireless transceiver 20 and accompanying antenna 18, a user interface 22, a speaker 24, power source 10, and a microphone 26. Wireless transceiver 20 receives and processes wireless signals via antenna 18 and transmits wireless signals via antenna 18. Wireless transceiver 20 may, for example, be a DECT transceiver, Bluetooth transceiver, or IEEE 802.11 transceiver.

Processor 2 allows for processing data, in particular managing RSSI data between wireless transceiver 20 and memory 30 for determining trends in RSSI values and the proximity of mobile device 102 to a base unit. In one example, processor 2 is a high performance, highly integrated, and highly flexible system-on-chip (SOC), including signal processing functionality such as echo cancellation/reduction and gain control in another example. Processor 2 may include a variety of processors (e.g., digital signal processors), with conventional CPUs being applicable.

Memory 30 may include a variety of memories, and in one example includes SDRAM, ROM, flash memory, or a combination thereof. Memory 30 may further include separate memory structures or a single integrated memory structure. In one example, memory 30 may be used to store passwords, network and telecommunications programs, and/or an operating system (OS).

Memory 30 stores an operational mode application program 8 capable of operating the mobile device in an active mode 28 or a low power mode 29. For example, in low power mode 29, unnecessary device operations may be put in sleep mode and RSSI processing is reduced. Memory 30 includes an RSSI analysis engine 32 for identifying trends in received or measured RSSI values.

In one example, while in low power mode 29, the mobile device periodically retrieves the most recent RSSI measurement or measurements or causes the device to make a RSSI measurement. In one embodiment, the operational mode application program 8 briefly wakes to retrieve or make the RSSI measurement and process the RSSI value to determine whether to enter active mode. For example, the RSSI value may be received from wireless transceiver 20. Using RSSI analysis engine 32, the operational mode application program 8 processes the newly retrieved or measured RSSI together with previously received RSSI values to determine whether a pre-determined trend is present. If so, the operational mode application program 8 switches the mobile device to active mode 28. In active mode 28, more rapid RSSI measurements are made to quickly obtain an accurate RSSI measurement.

In operation, operational mode application program 8 selects and operates the mobile device in a low power mode 29 or an active mode 28. Processor 2 is configured to execute the operational mode application program 8 to process a first plurality of RSSI signals received during the low power mode 29 to identify a trend indicating possible movement of the mobile device 102 and switch to the active mode 28 responsive to identifying the trend, where the processor is further configured to process a second plurality of RSSI signals received during the active mode 32. In one example, the trend in the first plurality of RSSI values indicating possible movement of the mobile device includes a predetermined number of increasing RSSI values or a predetermined number of decreasing RSSI values.

TREND DETECTION EXAMPLES

In the following examples, a trend is declared if the RSSI values increase (decreases) n times in a row without a decrease (increase). The trend allows m repeats, where n and m are whole numbers. In this specific example, n=3 (number of increases to declare trend), m=2 (number of repeats allowed from last increase without cancelling trend):

Example 1

Steady state 55
55
55
56←first increase
57←second increase
57←first repeat
57←second repeat
58←third increase, declare trend.

Example 2

55
55

56←first increase
57←second increase
57←first repeat
57←second repeat
57←third repeat, declare no trend, reset tracker Example 3

55
55
56←first increase
57←second increase
56←decrease, declare no trend, reset tracker This is just one example of any of a number of possible algorithms that can process RSSI values looking for a trend.

In one example, the second plurality of RSSI values is processed during active mode to determine an average RSSI value across a predetermined number of most recently received RSSI values. In one example, the operational mode application program 8 is configured to return the mobile device to the low power mode 29 following processing the second plurality of RSSI values.

In one example, the second plurality of RSSI values is processed to determine a ranging status of the mobile device with respect to a base unit. Memory 30 stores a proximity application 16 executed by processor 2 to determine the proximity of the mobile device 102. For example, the determined proximity may be a distance or an indication of a binary status of whether the mobile device is near or far from a base unit. The mobile device is designated NEAR if it is a distance less than a threshold NEAR/FAR distance and designated as FAR if it is a distance greater than the threshold NEAR/FAR distance. Proximity application 16 includes an RSSI analysis engine 34 which processes received RSSI values to determine range. Memory 30 may store RSSI values and predetermined RSSI NEAR/FAR threshold values for use by proximity application 16 to determine the NEAR/FAR status of mobile device 102. Memory 30 also includes a mobile device control application 12, and user interface application 14. In a further example, memory 30 includes a presence sampling/reporting application.

User interface 22 allows for manual communication between the mobile device user and the mobile device, and in one example includes an audio and/or visual interface such that a prompt may be provided to the user's ear and/or an LED may be lit.

In a further example, memory 30 stores an operational mode application program 8 for selecting and operating the mobile device in a reduced power mode or an active mode. In operation, processor 2 is configured to execute the operational mode application program 8 to receive a status update message received during the reduced power mode and switch to the active mode responsive to the status update message, where the processor 2 is further configured to process a second plurality of RSSI signals received during the active mode. In one example, the status update message is an identified trend in RSSI values measured during reduced power mode.

In one example, the status update message is a change in transmit power between the base unit and the mobile device. For example, the RSSI measuring device (e.g., mobile device 102) requests the current transmit power (TxPower) level from the other device (e.g., base unit 104) every time it does its low duty-cycle wake-up in low-power mode, or every time it detects a significant trend/change in power level and would enter active mode (i.e., wake itself up) anyway. In another example, the base is monitoring its Tx power and when it determines a change in own Tx power has occurred, it sends a status update message to the mobile.

In one example, the status update message is a detection of movement of the mobile device 102 utilizing a motion detector. For example, the motion detector is a motion detector external to the mobile device 102, such as an infrared detector. Detection of motion by the external motion detector acts as a trigger for the device to wake-up and enter active mode to update the RSSI. The external motion detector may be located at the base unit 104 or elsewhere. Alternatively, the mobile device 102 may have a wireless connection to the motion detector and whenever it detects motion, the motion detector alerts the mobile device 102 directly rather than the base unit 104 as a reason to wake-up and enter active mode. Accurate ranging using RSSI measurements in active mode is utilized following the detection of motion by the motion detector, which may not provide precise ranging data.

In a further example, the motion detector is a motion detector internal to the mobile device 102, such as an accelerometer or gyroscope. Detection of motion by the internal motion detector acts as a trigger for the mobile device 102 to wake-up and enter active mode to update the RSSI (i.e., sample and average the RSSI values).

Figure 3:
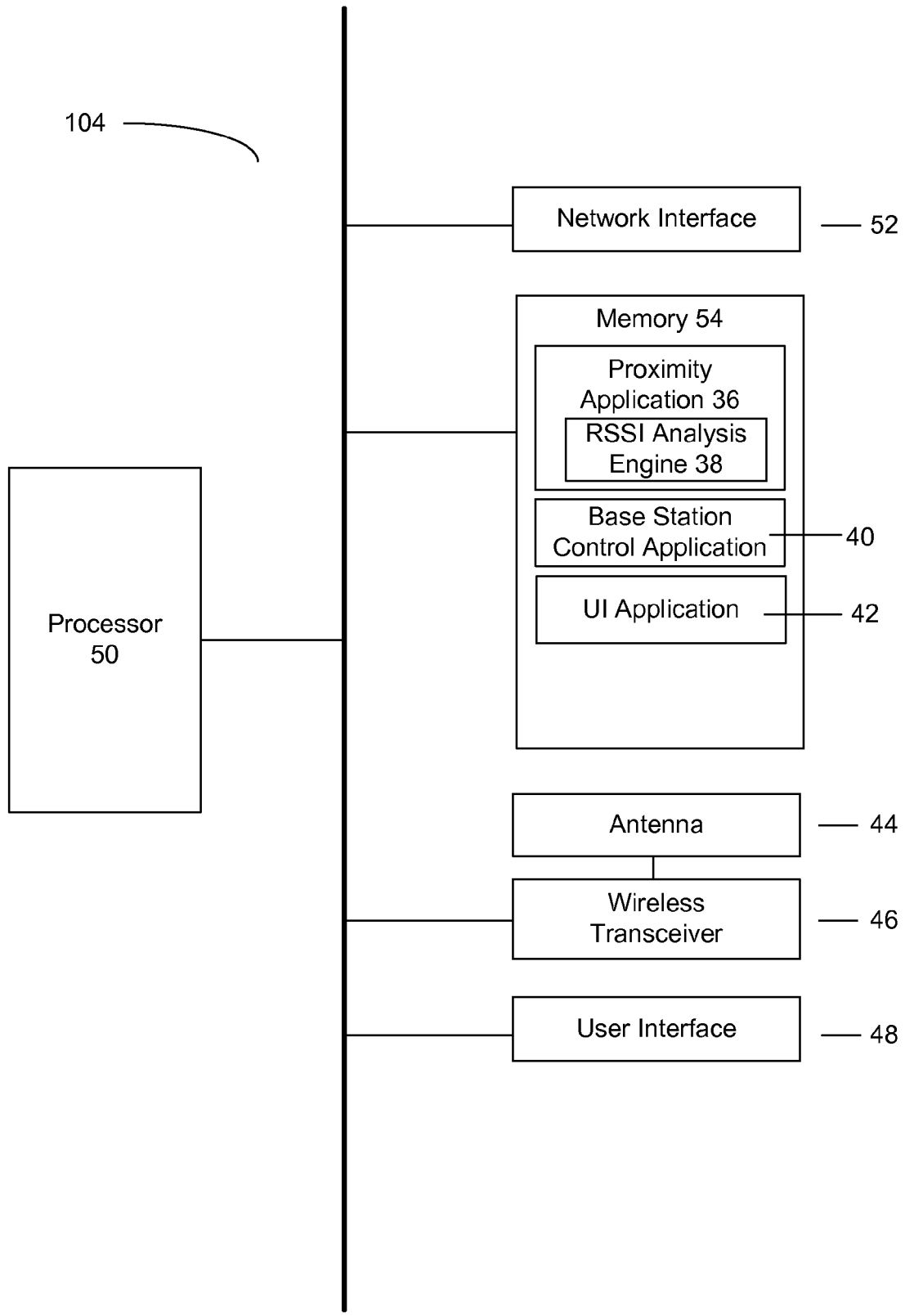
FIG. 3 illustrates the base unit shown in FIG. 1.

FIG. 3 illustrates the base unit shown in FIG. 1 in one example. FIG. 3 illustrates a block diagram of a base unit with a proximity application. FIG. 3 is meant to illustrate that the proximity application can reside on either the mobile device as shown in FIG. 2, or on the base unit, as shown in FIG. 3. Regardless of where the proximity application resides, the result of a proximity determination may be sent to the other device. In a further example, both a mobile device and a base unit have a proximity application.

Referring now to FIG. 3 in conjunction with FIG. 1, a simplified block diagram of an example of base unit 104 is shown. Base unit 104 includes a processor 50 operably coupled to a memory 54, a wireless transceiver 46 and accompanying antenna 44, a network interface 52, and a user interface 48. Wireless transceiver 46 may for example, be a DECT transceiver, Bluetooth transceiver, or IEEE 802.11 transceiver.

Processor 50 allows for processing data, in particular managing RSSI data between wireless transceiver 46 and memory 54 for determining the proximity status of base unit 104. In one example, processor 50 is a high performance, highly integrated, and highly flexible system-on-chip (SOC), including signal processing functionality such as echo cancellation/reduction and gain control in another example. Processor 50 may include a variety of processors (e.g., digital signal processors), with conventional CPUs being applicable.

Memory 54 may include a variety of memories, and in one example includes SDRAM, ROM, flash memory, or a combination thereof. Memory 54 may further include separate memory structures or a single integrated memory structure. In one example, memory 54 may be used to store passwords, network and telecommunications programs, and/or an operating system (OS). Memory 54 stores a proximity application program 36 executed by processor 50 to determine the proximity (e.g., NEAR/FAR status) of the mobile device 102 relative to the base unit 104. Proximity application program 36 includes an RSSI analysis engine 38. Memory 54 may store RSSI values and predetermined RSSI NEAR/FAR threshold values for use by proximity application program 36 to determine the NEAR/FAR status of base unit 104. Memory 54 also includes a base unit control application 40 and a user interface application 42. User interface 48 allows for manual communication between the base unit user and the base unit, and in one example includes an audio and/or visual interface.

Figure 4:
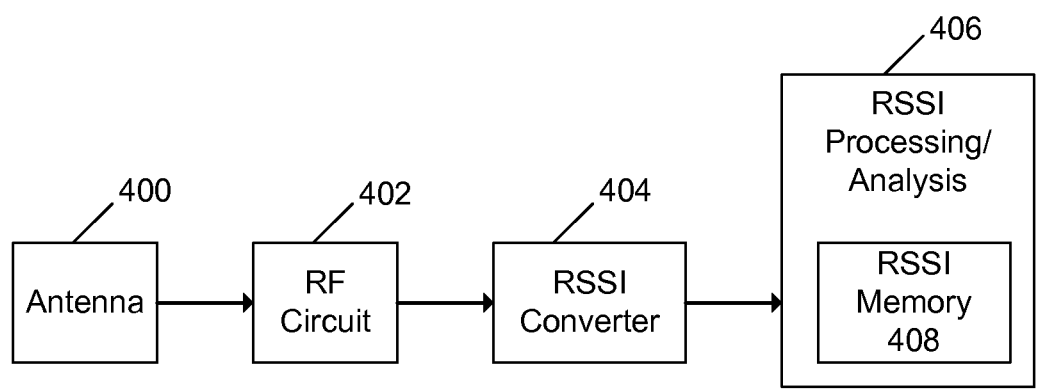
FIG. 4 is a diagram illustrating RSSI processing at a mobile device.

Mobile device 102 includes a wireless receiver for receiving a wireless signal. The receiver detects received wave strength of the wireless signal periodically at a time determined by a timing circuit and outputs a strength signal indicating the received wave strength. In one example, RSSI is determined by a digital receiver by signal processing the received signals. When correlated against themselves digitally (and often other protocol specific constraints) they provide a value proportional to received signal strength. FIG. 4 is a diagram illustrating RSSI processing at a mobile device in one example. An RF circuit 402 is adapted to transmit and receive radio wave signals though an antenna 400. The RF circuit 402 receives transmitting data supplied from a modulator to transmit RF signals from the antenna 400. The RF circuit 402 receives radio wave signals carrying data in an analog signal and outputs the analog signal to an RSSI converter 404. A control circuit including a timer circuit controls operation of the transmission and reception of signals, such as periodically enabling and disabling transmission and reception of data.

The received analog signal indicates the strength of the received electromagnetic waves to the RSSI converter 404. The RSSI converter 404 is adapted to receive the analog signal indicating the strength of a received electromagnetic wave from the RF circuit 402 and process it to output a numerical RSSI value indicating the received wave strength. The analog signal is converted to digital form using an analog to digital converter (ADC) during this process. RSSI values are stored in an RSSI memory unit 408 at an RSSI processing/analysis block 406. Stored RSSI values are processed and analyzed as described herein. One of ordinary skill will recognize that RSSI may be measured utilizing a variety of known methods.

Figure 5:
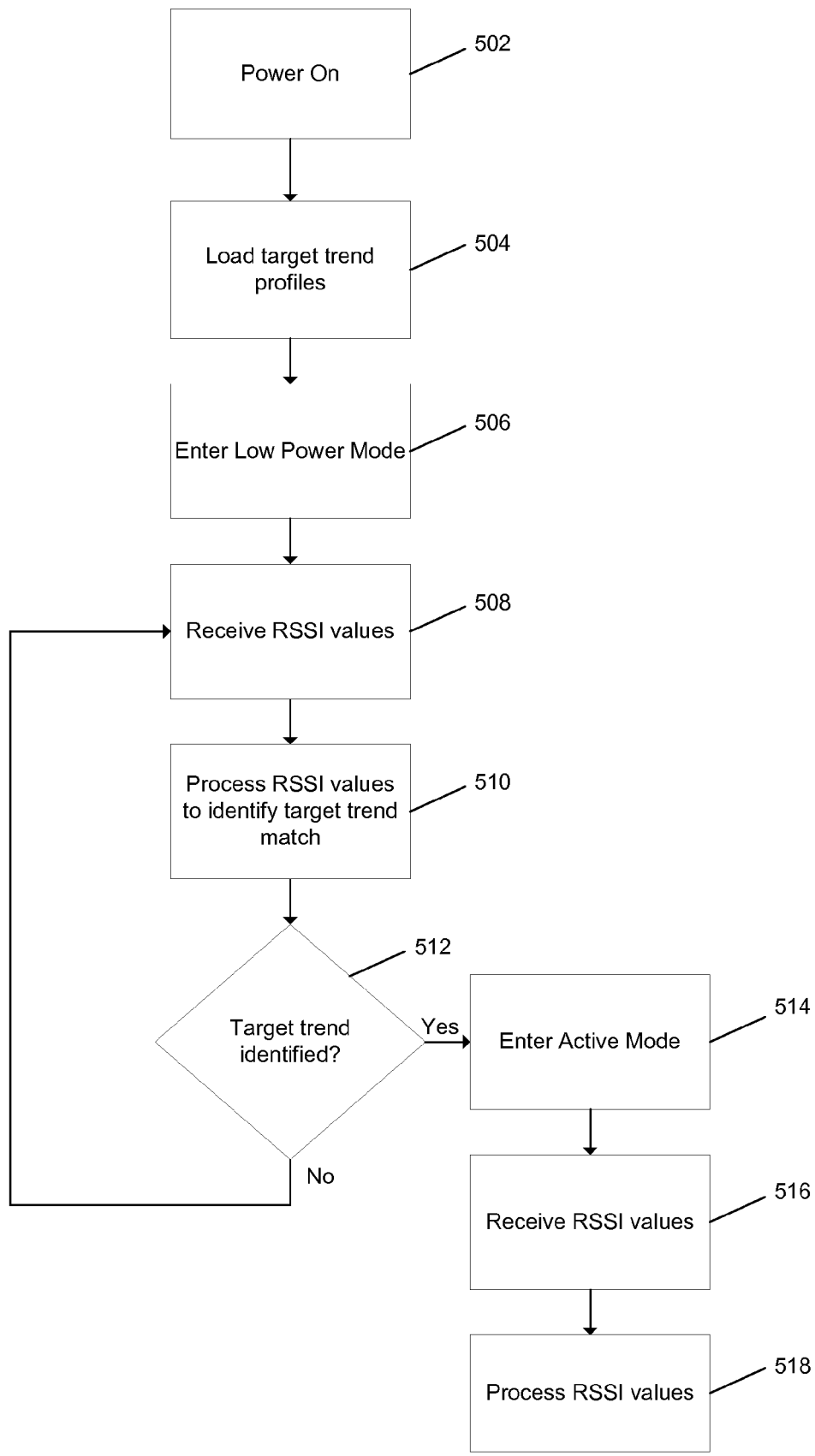
FIG. 5 is a flow diagram illustrating switching between a low power mode and an active mode in one example.

FIG. 5 is a flow diagram illustrating switching between a low power mode and an active mode in one example. For example, the process shown in FIG. 5 may be implemented at mobile device 102. At block 502, the mobile device is powered on. At block 504, target trend profiles are loaded into memory to be utilized when analyzing received RSSI values. At block 506, the low power mode is entered. Low power mode may be entered for a variety of reasons, such as inactivity of the mobile device for a predetermined period of time.

At block 508, a first plurality of RSSI values are received during operation of a mobile device in a reduced power mode. At block 510, the first plurality of RSSI values are processed to identify a trend in the first plurality of RSSI values indicating possible movement of the mobile device.

At decision block 512, it is determined whether the RSSI values match one of the target trend profiles. In one example, a target trend profile is a trend in which the first plurality of RSSI values includes a predetermined number of increasing RSSI values. In one example, a target trend profile is a trend in which the first plurality of RSSI values includes a predetermined number of decreasing RSSI values. In one example, a target trend profile is a trend in which the first plurality of RSSI values includes a predetermined number of increasing RSSI values without repeat. In one example, a target trend profile is a trend in which the first plurality of RSSI values includes a predetermined number of decreasing RSSI values without repeat.

If no at decision block 512, the process returns to block 508. If yes at decision block 512, at block 514, the active mode is entered at the mobile device responsive to identification of the trend. In one example, entering an active mode at the mobile device is responsive to receiving an enter active mode command message at the mobile device from a base unit.

At block 516, a second plurality of RSSI values are received during operation of the mobile device in the active mode. In one example, the first plurality of RSSI values comprise a first series of RSSI values measured at a first frequency rate associated with the reduced power mode, and the second plurality of RSSI values comprise a second series of RSSI values measured at a second frequency rate associated with the active mode, where the second frequency rate is greater than the first frequency rate.

At block 518, the second plurality of RSSI values are processed. In one example, processing the second plurality of RSSI values includes determining an average RSSI value across a predetermined number of most recently received RSSI values. In one example, processing the second plurality of RSSI values includes identifying a stationary trend or no trend in the second plurality of RSSI values indicating lack of movement of the mobile device, wherein the mobile device returns to the reduced power mode responsive to the stationary trend or no trend.

In one example, processing the second plurality of RSSI values includes determining a ranging status of the mobile device with respect to a base unit. For example, the ranging status may include a near status or a far status, whether the mobile device is moving, or the distance between the mobile device with respect to the base unit. In one example, the second plurality of RSSI values are combined with the first plurality of RSSI signals and processed together.

In one example, the mobile device is returned to the reduced power mode at the mobile device following processing the second plurality of RSSI values. For example, returning to the reduced power mode at the mobile device is responsive to receiving a reduced power mode command message at the mobile device from a base unit.

Figure 6:
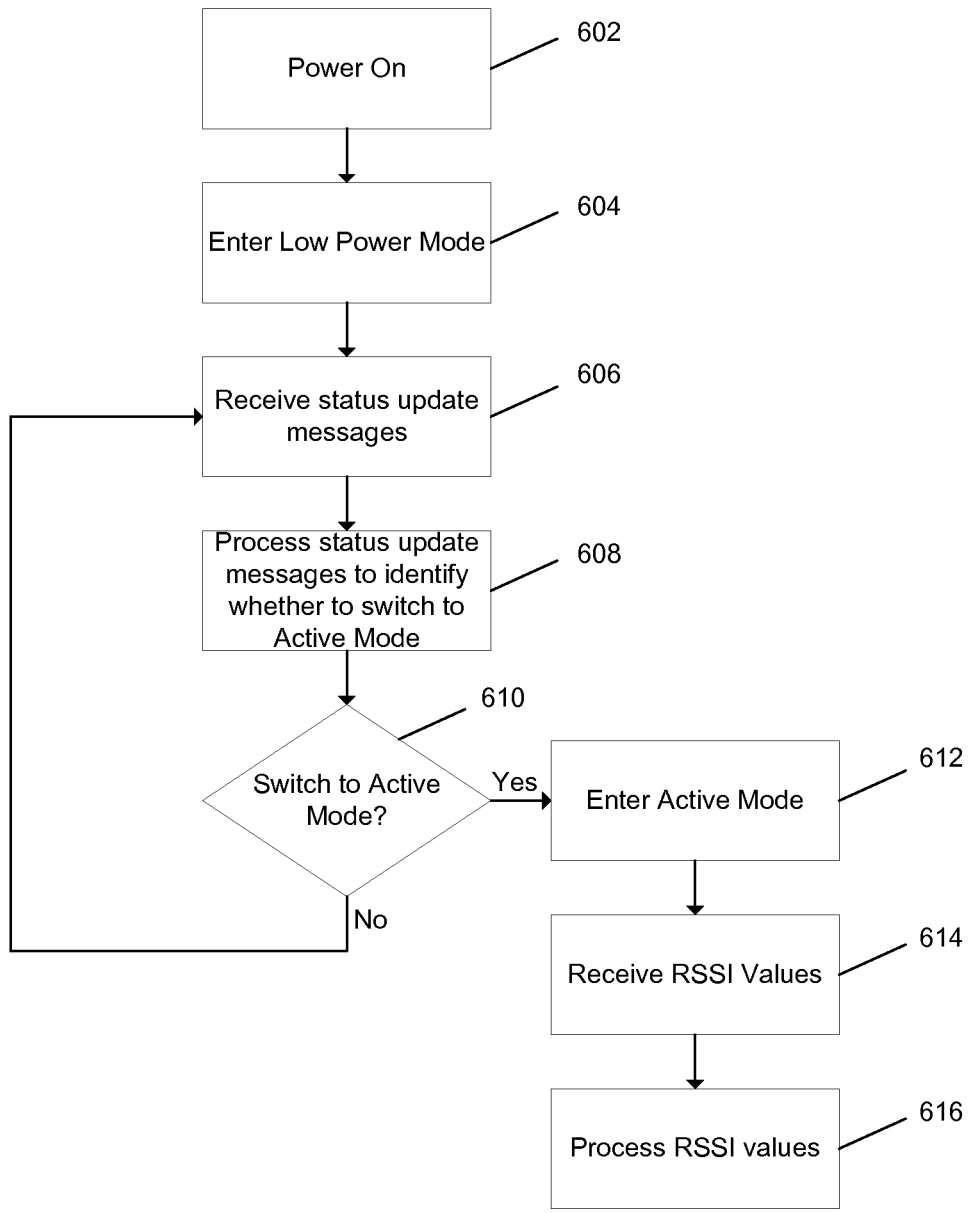
FIG. 6 is a flow diagram illustrating switching between a low power mode and an active mode in a further example.

FIG. 6 is a flow diagram illustrating switching between a low power mode and an active mode in a further example. For example, the process shown in FIG. 6 may be implemented at mobile device 102. At block 602, the mobile device is powered on. At block 604, the low power mode is entered. At block 606, status update messages are received. In one example, the status update message is a change in transmit power between a base unit and the mobile device. In one example, the status update message is an identified trend in RSSI values.

In one example, the status update message is a detection of movement of the mobile device utilizing a motion detector. For example, the motion detector is a motion detector external to the mobile device, such as an infrared detector. In a further example, the motion detector is a motion detector internal to the mobile device, such as an accelerometer or gyroscope.

At block 608, the received status update messages are processed to identify whether to switch to active mode. For example, a switch to active mode is made if the status update message indicates a change in transmit power or movement of the mobile device. At decision block 610, it is determined whether a switch to active mode is to be made. If no at decision block 610, the process returns to block 606.

If yes at decision block 610, at block 612, the active mode is entered at the mobile device. At block 614, RSSI values are received while the device is operated in active mode. At block 616, the received RSSI values are processed. In one example, processing the plurality of RSSI values includes determining a ranging status of the mobile device with respect to a base unit. In one example, the mobile device is returned to the reduced power mode following processing the plurality of RSSI values.

While the exemplary embodiments of the present invention are described and illustrated herein, it will be appreciated that they are merely illustrative and that modifications can be made to these embodiments without departing from the spirit and scope of the invention. For example, the methods used to determine range or near/far status utilizing RSSI may vary. Thus, the scope of the invention is intended to be defined only in terms of the following claims as may be amended, with each claim being expressly incorporated into this Description of Specific Embodiments as an embodiment of the invention.

What is claimed is:

1. A method for measuring RSSI comprising:
receiving a first plurality of RSSI values at a first rate during operation of a mobile device in a reduced power mode;
processing the first plurality of RSSI values to identify a current movement of the mobile device with respect to a base unit during the reduced power mode, wherein the processing comprises identifying a trend in the first plurality of RSSI values;
entering an active mode at the mobile device responsive to identification of the current movement of the mobile device with respect to the base unit, the active mode comprising receiving a plurality of RSSI values at a second rate higher than the first rate;
receiving a second plurality of RSSI values at the second rate during operation of the mobile device in the active mode; and
processing the second plurality of RSSI values to determine a range of the mobile device with respect to the base unit.

2. The method of claim 1, wherein processing the second plurality of RSSI values comprises determining an average RSSI value across a predetermined number of most recently received RSSI values.

3. The method of claim 1, further comprising returning to the reduced power mode at the mobile device following processing the second plurality of RSSI values to determine the range of the mobile device with respect to the base unit.

4. The method of claim 3, wherein returning to the reduced power mode at the mobile device is responsive to receiving a reduced power mode command message at the mobile device from a base unit.

5. The method of claim 1, wherein processing the second plurality of RSSI values further comprises identifying a stationary trend or no trend in the second plurality of RSSI values indicating lack of movement of the mobile device with respect to the base unit, wherein the mobile device returns to the reduced power mode responsive to identifying the stationary trend or no trend.

6. The method of claim 1, wherein the trend in the first plurality of RSSI values indicating possible movement of the mobile device comprises a predetermined number of increasing RSSI values or a predetermined number of decreasing RSSI values.

7. The method of claim 1, wherein the trend in the first plurality of RSSI values indicating possible movement of the mobile device comprises a predetermined number of increasing RSSI values without repeat or a predetermined number of decreasing RSSI values without repeat.

8. The method of claim 1, wherein the first plurality of RSSI values comprise a first series of RSSI values measured at a first frequency rate associated with the reduced power mode, and the second plurality of RSSI values comprise a second series of RSSI values measured at a second frequency rate associated with the active mode, where the second frequency rate is greater than the first frequency rate.

9. The method of claim 1, wherein entering an active mode at the mobile device is responsive to receiving an enter active mode command message at the mobile device from a base unit.

10. The method of claim 1, wherein the range comprises a near status or a far status.

11. The method of claim 1, wherein the range comprises whether the mobile device is moving or a distance between the mobile device with respect to the base unit.

12. A method comprising:
operating a mobile device in a reduced power mode;
determining a first range of the mobile device with respect to a base unit while operating in the reduced power mode;
receiving a status update message during operation of a mobile device in a reduced power mode, wherein the status update message comprises a detection of movement of the mobile device utilizing a motion detector;
entering an active mode at the mobile device responsive to the status update message comprising the detection of movement of the mobile device utilizing a motion detector;
receiving a plurality of RSSI values during operation of the mobile device in the active mode;
processing the plurality of RSSI values to determine a second range of the mobile device with respect to the base unit; and
returning to the reduced power mode at the mobile device following determining the mobile device is stationary in range with respect to the base unit.

13. The method of claim 12, wherein the status update message further comprises a change in transmit power between a base unit and the mobile device.

14. The method of claim 12, wherein the motion detector is a motion detector external to the mobile device.

15. The method of claim 14, wherein the motion detector external to the mobile device is an infrared detector.

16. The method of claim 12, wherein the motion detector is a motion detector internal to the mobile device.

17. The method of claim 16, wherein the motion detector internal to the mobile device is an accelerometer or gyroscope.

18. The method of claim 12, wherein the status update message further comprises an identified trend in RSSI values.

19. A mobile device comprising:
a wireless transceiver for sending and receiving signals;
a memory storing an operational mode application program for selecting and operating the mobile device in a reduced power mode or an active mode; and
a processor configured to execute the operational mode application program to process a first plurality of RSSI values at a first rate received during the reduced power mode to identify a current movement of the mobile device with respect to a base unit during the reduced power mode, wherein the processing comprises identifying a trend, and switch to the active mode responsive to identifying the current movement of the mobile device, the active mode comprising receiving a plurality of RSSI values at a second rate higher than the first rate, wherein the processor is further configured to process the second plurality of RSSI values received during the active mode at the second rate to determine a range of the mobile device with respect to the base unit.

20. The mobile device of claim 19, wherein the second plurality of RSSI values is processed to determine an average RSSI value across a predetermined number of most recently received RSSI values.

21. The mobile device of claim 19, wherein the operational mode application program is configured to return the mobile device to the reduced power mode at the mobile device following processing the second plurality of RSSI values to determine the range of the mobile device with respect to the base unit.

22. The mobile device of claim 19, wherein the trend in the first plurality of RSSI values indicating possible movement of the mobile device comprises a predetermined number of increasing RSSI values or a predetermined number of decreasing RSSI values.

23. A mobile device comprising:
a wireless transceiver for sending and receiving signals;
a memory storing an operational mode application program for selecting and operating the mobile device in a reduced power mode or an active mode; and
a processor configured to execute the operational mode application program to determine a first range of the mobile device with respect to a base unit while operating the mobile device in the reduced power mode and receive a status update message during the reduced power mode, wherein the status update message comprises a detection of movement of the mobile device utilizing a motion detector, and switch to the active mode responsive to the status update message comprising the detection of movement of the mobile device utilizing a motion detector, wherein the processor is further configured to process a second plurality of RSSI signals received during the active mode to determine a second range of the mobile device with respect to the base unit and switch back to the reduced power mode following a determination the mobile device is stationary in range with respect to the base unit.

24. The mobile device of claim 23, wherein the status update message further comprises a change in transmit power between a base unit and the mobile device.

25. The mobile device of claim 23, wherein the motion detector is a motion detector external to the mobile device.

26. The mobile device of claim 23, wherein the motion detector is a motion detector internal to the mobile device.

27. The mobile device of claim 23, wherein the status update message further comprises an identified trend in RSSI values measured during reduced power mode.

* * * * *